United States Patent
Gurr et al.

(10) Patent No.: US 10,014,816 B2
(45) Date of Patent: Jul. 3, 2018

(54) METHOD AND ARRANGEMENT FOR TESTING THE OPERATION OF AN ACTUATING CIRCUIT OF A DC MOTOR

(71) Applicant: Andreas Stihl AG & Co. KG, Waiblingen (DE)

(72) Inventors: Kay-Steffen Gurr, Heilbronn (DE); Gernot Liebhard, Waiblingen (DE)

(73) Assignee: Andreas Stihl AG & Co. KG, Waiblingen (DE)

( * ) Notice: Subject to any disclaimer, the term of this patent is extended or adjusted under 35 U.S.C. 154(b) by 0 days.

(21) Appl. No.: 15/452,468

(22) Filed: Mar. 7, 2017

(65) Prior Publication Data

US 2017/0257053 A1     Sep. 7, 2017

(30) Foreign Application Priority Data

Mar. 7, 2016    (DE) .................. 10 2016 002 740

(51) Int. Cl.

| H02P 1/00 | (2006.01) |
|---|---|
| H02P 3/00 | (2006.01) |
| H02P 5/00 | (2016.01) |
| H02P 29/024 | (2016.01) |
| H02P 7/285 | (2016.01) |

(52) U.S. Cl.
CPC .......... *H02P 29/0241* (2016.02); *H02P 7/285* (2013.01); *H02P 29/024* (2013.01)

(58) Field of Classification Search
CPC .................................................. H02P 29/0241
USPC .................................. 318/139; 324/416, 527
See application file for complete search history.

(56) References Cited

U.S. PATENT DOCUMENTS

| 8,232,752 B2 | 7/2012 | Kezobo et al. | |
|---|---|---|---|
| 9,435,857 B2* | 9/2016 | Schmauss | .......... G01R 31/3277 |
| 2003/0111972 A1* | 6/2003 | Strothmann | ............ B60L 11/00 |
| | | | 318/268 |
| 2012/0249027 A1* | 10/2012 | Wichert | ............... H02P 29/032 |
| | | | 318/400.3 |
| 2012/0313561 A1 | 12/2012 | Okamoto | |
| 2014/0347067 A1* | 11/2014 | Hirono | .................... H02M 1/32 |
| | | | 324/537 |

FOREIGN PATENT DOCUMENTS

JP         H06343289 A      12/1994

* cited by examiner

*Primary Examiner* — Erick Glass
(74) *Attorney, Agent, or Firm* — Walter Ottesen, P.A.

(57) ABSTRACT

A method for testing the operation of an actuating circuit of a DC motor is disclosed, wherein electrical voltage connections of the DC motor are connected to a voltage source via the actuating circuit. An operating switch is arranged between the actuating circuit and the voltage source for starting up the DC motor via the actuating circuit. When the operating switch is switched on, the actuating circuit is initialized. Initialization prompts the potential on a voltage connection of the DC motor to be checked, and an indicator is actuated if, during the check, a potential on the voltage connection of the DC motor is determined that is above a prescribed limit value.

15 Claims, 2 Drawing Sheets

METHOD AND ARRANGEMENT FOR TESTING THE OPERATION OF AN ACTUATING CIRCUIT OF A DC MOTOR

CROSS REFERENCE TO RELATED APPLICATION

This application claims priority of German patent application no. 10 2016 002 740.1, filed Mar. 7, 2016, the entire content of which is incorporated herein by reference.

FIELD OF THE INVENTION

The invention relates to a method and an apparatus for checking the operation of an actuating circuit of a DC motor, wherein electrical voltage connections of the DC motor are connected to a voltage source via the actuating circuit and there is an operating switch arranged between the actuating circuit and the voltage source for starting up the DC motor via the actuating circuit.

BACKGROUND OF THE INVENTION

The supply voltage of a voltage source is connected to the DC motor via the actuating circuit in accordance with prescribed parameters in order to regulate the power and/or speed of the DC motor. To this end, the actuating circuit uses a control arrangement, preferably what is known as pulse width modulation, which involves voltage pulses of variable width being supplied to the DC motor. In accordance with the pulse width of the voltage pulses, a speed is established on the DC motor.

An actuating circuit uses electronic switching elements such as transistors, thyristors, MOSFETs or similar components in order to be able to take prescribed parameters as a basis for setting the pulse width over the entire operating range of the DC motor. If an electronic component fails on account of a defect, two states can essentially arise.

If the defective component breaks the circuit permanently, the DC motor will no longer be able to be operated; if the defective component is conductive, then the DC motor can rotate even without the PWM actuation, the applied storage battery voltage acting on the DC motor in unregulated fashion. The electronic disturbance in the actuating circuit cannot readily be discerned by the user.

SUMMARY OF THE INVENTION

It is an object of the invention to provide a method and an apparatus for checking the operation of an actuating circuit before a DC motor is started up in order to identify an electronic disturbance in the actuating circuit at an early stage.

The object can, for example, be achieved by a method for testing the operation of an actuating circuit of a DC motor; the DC motor having electrical voltage connections; the electrical voltage connections of the DC motor being connected to a voltage source via the actuating circuit; the electrical voltage connections further being connected to an operating switch arranged between the actuating circuit and the voltage source; and, the operating switch being configured to start the DC motor via the actuating circuit. The method includes: switching on the operating switch; initializing the actuating circuit with the switching on of the operating switch; detecting a potential on one of the voltage connections of the DC motor within a time window $\Delta T$ after beginning the initialization of the actuating circuit and prior to a start-up of the DC motor; and, actuating an indicator when, during the detecting, the potential detected at the voltage connection of the DC motor is greater than a predetermined limit value.

For the method for checking the operation of an actuating circuit of a DC motor, it is assumed that the system is initially de-energized. When the operating switch is switched on, the supply voltage of the voltage source is connected to the actuating circuit, which initializes the latter.

At the beginning of initialization of the actuating circuit and before startup of the DC motor by the actuating circuit, the potential prevailing on at least one voltage connection of the DC motor is checked on this connection. If the actuating circuit is operating correctly, the potential would need to be low or zero, since the DC motor is stationary and hence also cannot produce an EMF generator voltage that can be tapped off from the voltage connections. If, by contrast, the check reveals a potential present on the voltage connection of the DC motor that is above a prescribed limit value, then a fault can be assumed, since the motor was already rotating before actuation by the actuating circuit. In this case, an indicator is actuated in order to indicate the malfunction in the actuating circuit to the user.

Advantageously, the check on the potential on the voltage connection of the DC motor is effected within a time window that is needed for initializing the actuating circuit. Thus, while the actuating circuit is being initialized, the potential on the voltage connection of the DC motor is checked and evaluated.

The time window for the initialization is in a range from 5 to 500 milliseconds.

In order to carry out a method according to the invention, there is provision for a test apparatus for detecting the potential on the voltage connection to be started up at the same time as the operating switch is switched on.

The limit value below which correct operation of the actuating circuit can be assumed is expediently derived from a potential profile on the voltage connections that is admissible when the DC motor starts. If the voltage determined on a voltage connection of a DC motor is above this limit value, then it can be assumed that an inadmissible potential profile is present and hence there is a fault in the actuating circuit.

As an expedient indicator for the faultiness of the actuating circuit, a visual indicator is actuated. An audible indicator may be expedient.

The object can, for example, also be achieved by a motor arrangement including: a DC motor having electrical voltage connections; an actuating circuit; the electrical voltage connections being configured to connect to a voltage source via the actuating circuit; an operating switch arranged between the actuating circuit and the voltage source and configured to start up the DC motor via the actuating circuit; a testing device configured to detect a potential at the voltage connections of the DC motor within a time window $\Delta t$ after an initialization of the actuating circuit begins and prior to the DC motor starting up; a measurement line connecting the testing device to one of the voltage connections; an indicator; and, the testing device being configured to actuate the indicator when the potential applied to the measurement line which is above a predetermined limit value.

The apparatus for checking the operation of an actuating circuit of a DC motor includes a test apparatus for detecting the potential on the voltage connection of the DC motor within a time window after the beginning of the initialization of the actuating circuit and before startup of the DC motor. The test apparatus is connected by at least one measuring line to a voltage connection of the DC motor and actuates an indicator when the potential present on the measuring line is above a prescribed limit value.

Expediently, the test apparatus and the actuating apparatus are arranged in a shared housing and particularly on a shared circuit board.

Since the voltage source and the DC motor have an actuating circuit provided between them that expediently operates on the basis of the principle of pulse width modulation, the supply voltage of the voltage source can be chosen to be higher than the admissible operating voltage of the DC motor.

The indicator actuated by the test apparatus is advantageously a visual indicator, particularly a light emitting diode (LED).

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
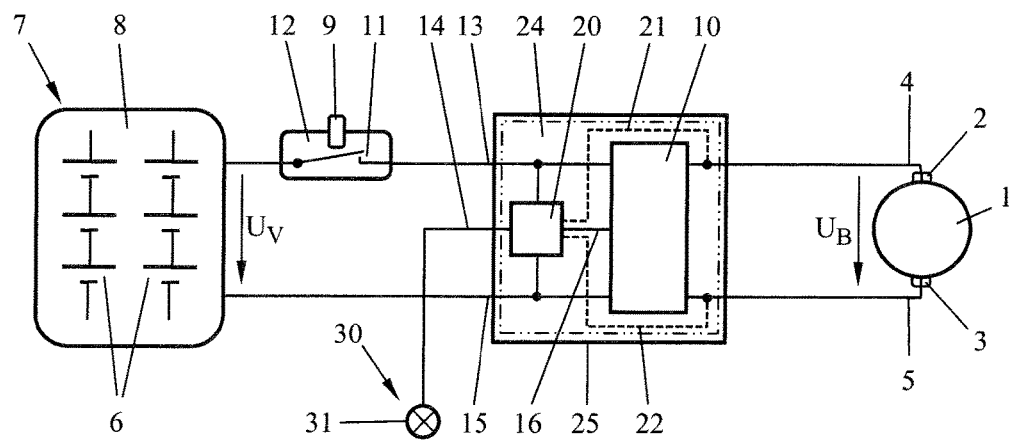
FIG. 1 is a schematic depiction of a circuit arrangement of an apparatus for checking the operation of an actuating circuit of a DC motor.

The circuit arrangement in FIG. 1 shows an apparatus for checking an actuating circuit 10 for a DC motor 1. The DC motor 1 is a DC motor having collector brushes 2, 3.

The electrical voltage connections 4, 5, which are connected to the collector brushes 2, 3, have an operating voltage UB applied to them. The operating voltage UB is provided by the actuating circuit 10, which is connected to a voltage source 7 via an operating switch 12.

The voltage source 7 is formed by a storage battery pack 8, the single cells 6 of which form a cell cluster. The supply voltage $U_V$ of the voltage source 7 is connected to the actuating circuit 10 via the operating switch 12.

The actuating circuit 10 operates on the basis of the principle of pulse width modulation. The supply voltage $U_V$ of the voltage source 7 may be higher than the admissible operating voltage $U_B$ of the DC motor 1. The pulse width modulation can easily be used to adjust the operating voltage $U_B$. If the power output stages of the actuating circuit are destroyed in the conductive state during such PWM actuation, then the DC motor 1 rotates even without the function of the PWM actuation. The user cannot readily identify the fault. In the event of a fault, the operating voltage $U_B$ may be at the level of the storage battery voltage.

When the operating pin 9 is depressed, the contact 11 of the operating switch 12, which is preferably in the form of a micro switch, is closed and the supply voltage $U_V$ is connected to input terminals 13, 15 of the actuating circuit 10.

The circuit arrangement further includes a test apparatus 20 that is connected via at least one measuring line 21, 22 to one of the voltage connections 4, 5 of the DC motor 1. In the embodiment shown, a measuring line 21 is connected to the voltage connection 4 of the collector brush 2 and a measuring line 22 is connected to the voltage connection 5 of the collector brush 3. The test apparatus 20 is connected via the input terminals 13, 15 to the supply voltage $U_V$ and has a first output 14 that actuates an indicator 30. In the embodiment shown, the indicator 30 is a visual indicator, particularly an LED 31.

A signal line 16 connects the test apparatus 20 to the actuating circuit 10.

As depicted in FIG. 1, the test apparatus 20 and the actuating apparatus 10 are arranged in a shared housing 25. Preferably, the actuating circuit 10 and the test apparatus 20 are arranged on a shared circuit board 24.

The supply voltage $U_V$ of the storage battery pack 8 is expediently provided so as to be higher than the admissible operating voltage $U_B$ of the DC motor 1. The storage battery pack 8 particularly includes lithium-based single cells 6.

Figure 2:
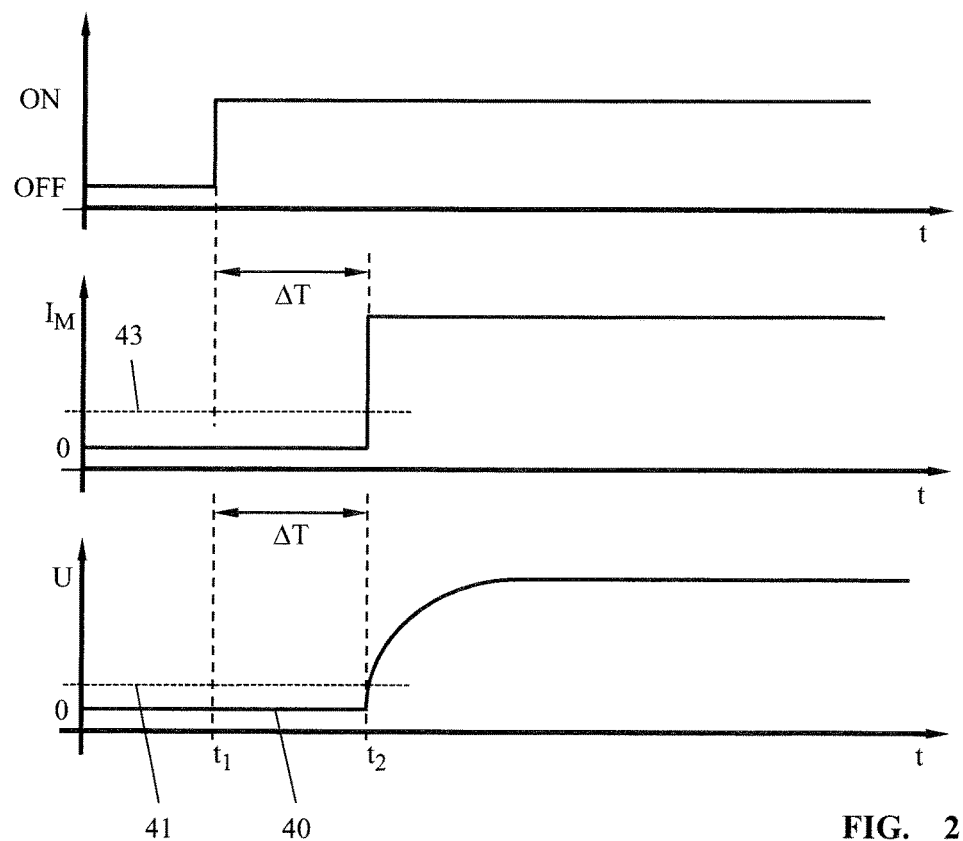
FIG. 2 is a schematic depiction of a graph for depicting the profile of the motor current and the back generator voltage (EMF—electromagnetic force) for a correctly operating actuating circuit; and, FIG. 3 is a depiction as shown in FIG. 2 for an incorrectly operating actuating circuit.

When the actuating circuit 10 between the voltage source 7 and the DC motor 1 is operating correctly, the graphs depicted in FIG. 2 are obtained.

The top graph in FIG. 2 shows the state of the operating switch 12; in the "off" state, the contact 11 is open; in the "on" state, the contact 11 is closed.

When the contact 11 is closed, the supply voltage $U_V$ is connected to the input terminals 13, 15 of the actuating circuit. When the voltage is applied to the actuating circuit 10, the latter is initialized.

Initialization of the actuating circuit 10 includes correctly starting a microprocessor arranged in the actuating circuit, executing test routines and adopting a prescribed, defined electrical starting position. This initialization of the actuating circuit 10 requires 5 to 500 milliseconds.

Within a time window ΔT after the beginning of initialization of the actuating circuit and before the DC motor 1 is started up, the test apparatus 20 is used to check the potential 40 on at least one of the voltage connections 4, 5 of the DC motor, as depicted in the bottom graph in FIG. 2. In the embodiment shown, the potential 40 between the voltage connections 4, 5 of the DC motor 1 is tested.

In the depiction of FIG. 2, the bottom graph reproduces the generator voltage U(EMF) of the DC motor 1 between the voltage connections 4 and 5. The potential 40 is below a limit value 41; the actuating circuit 10 is operating correctly.

As an alternative or in addition to checking the back generator voltage U, it is also possible to check the current draw I of the DC motor 1, as depicted in the middle graph in FIG. 2. If the current draw is below a limit value 43 within the time window ΔT for initialization of the actuating circuit 10, then the latter is operating correctly.

FIG. 2 shows that at the time $t_1$, the operating switch 12 is switched on and, in the time window ΔT for the initialization to the time $t_2$, neither the potential of the generator voltage U(EMF) exceeds a prescribed limit value 41 nor is there a current draw above the limit value 43 by the DC motor 1. The actuating circuit is operating correctly. The indicator 30 is not actuated.

Figure 3:
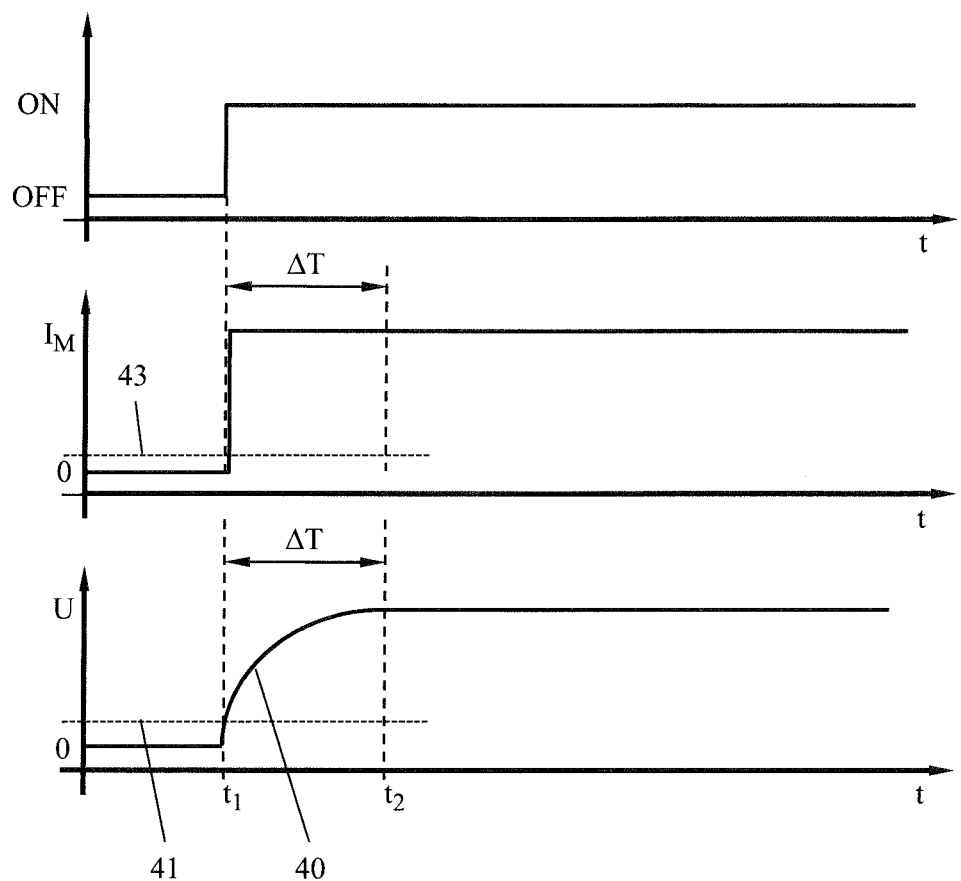

In the depiction shown in FIG. 3, the operating switch 12 is switched on at the time $t_1$; when the operating switch 12 is switched on, the supply voltage $U_V$ is applied to the input terminals 13, 15 of the actuating circuit 10, and the actuating circuit then starts its initialization. The initialization has the associated time window ΔT up to the time $t_2$. When initialization of the actuating circuit 10 begins and before the DC motor 1 is started up, the potential 40 on the voltage connection 4, 5 of the DC motor 1 is checked. As FIG. 3 shows, the potential 40 of the generator voltage has risen above the limit value 41 within the time window ΔT. Since the potential 40 is above the limit value 41, the test apparatus 20 actuates the indicator 30. Advantageously, the indicator is a visual indicator, particularly an LED 31.

As depicted in FIGS. 2 and 3, the potential of the generator voltage U (EMF) is checked within the time window ΔT for the initialization. It may be sufficient for the check to be performed over a shorter time period than the time window ΔT for the initialization. The shorter time period is expediently within the time window ΔT for the initialization, which is in a range from 5 to 500 milliseconds.

The test apparatus 20 is—like the actuating circuit 10—applied to the supply voltage $U_v$ and started up at the same time as the operating switch 12 is switched on.

The determination of the limit value 41 of the generator voltage EMF can expediently be derived from a potential profile admissible when the DC motor 1 starts. In the same way, the limit value 43 of the admissible motor current $I_N$ can be derived from an admissible current profile when the DC motor 1 starts.

It is understood that the foregoing description is that of the preferred embodiments of the invention and that various changes and modifications may be made thereto without departing from the spirit and scope of the invention as defined in the appended claims.

What is claimed is:

1. A method for testing the operation of an actuating circuit for a DC motor; the actuating circuit including electronic switching elements; the DC motor having electrical voltage connections configured to connect to the actuating circuit; the actuating circuit being connected to a voltage source having a supply voltage $U_v$; the actuating circuit being configured to apply an operating voltage $U_B$ to the electrical voltage connections of the DC motor for the operation thereof; the supply voltage $U_v$ being greater than the operating voltage $U_B$; the electrical voltage connections further being connected to an operating switch arranged between the actuating circuit and the voltage source; and, the operating switch being configured to start the actuating circuit as well as the DC motor; the method comprising:
switching on the operating switch at a first point in time $t_1$;
initializing the electronic switching elements of the actuating circuit with said switching on of the operating switch;
detecting a potential on one of the voltage connections of the DC motor within a time window ΔT after the first point in time $t_1$ of the initialization of the actuating circuit and prior to an electrical start-up of the DC motor; and,
actuating an indicator when, within said time window ΔT after the first point in time $t_1$, the potential detected at the voltage connection of the DC motor is greater than a predetermined limit value.

2. The method of claim 1, wherein said detecting the potential at the voltage connection is performed within the time window ΔT of said initialization.

3. The method of claim 1, wherein the time window ΔT lies in a range from 5 to 500 milliseconds.

4. The method of claim 1, wherein a testing device configured to detect the potential at the voltage connection is started when the operating switch is switched on.

5. The method of claim 1, wherein the limit value is derived from an allowable potential course at a starting of the DC motor.

6. The method of claim 1, wherein the indicator is an optical indicator.

7. A motor arrangement comprising:
a DC motor having electrical voltage connections;
an actuating circuit including electronic switching elements;
said electrical voltage connections being configured to connect to a supply voltage $U_v$ of a voltage source via said actuating circuit;
said actuating circuit being configured to set an operating voltage $U_B$ for operating said DC motor;
said supply voltage $U_v$ being greater than said operating voltage $U_B$;
an operating switch arranged between said actuating circuit and the voltage source and configured to start up said actuating circuit and said DC motor;
a testing device configured to detect a potential at said voltage connections of said DC motor within a time window Δt after an initialization of said actuating circuit begins at a point in time $t_1$ and prior to said DC motor starting up;
a measurement line connecting said testing device to one of said voltage connections;
an indicator; and,
said testing device being configured to actuate said indicator when the potential applied to said measurement line, within the time window ΔT starting at the first point in time $t_1$ of the initialization of the actuating circuit and prior to a start-up of said DC motor, is above a predetermined limit value.

8. The motor arrangement of claim 7 further comprising:
a housing; and,
said testing device and said actuating circuit being arranged in said housing.

9. The motor arrangement of claim 7 further comprising:
a housing;
a circuit board disposed in said housing; and,
said testing device and said actuating circuit being arranged on said circuit board.

10. The motor arrangement of claim 7, wherein:
the voltage source is configured to supply the supply voltage $U_v$; and,
the supply voltage $U_v$ is greater than a permissible operating voltage $U_B$ of said DC motor.

11. The motor arrangement of claim 7, wherein said indicator is an optical indicator.

12. The motor arrangement of claim 7, wherein said indicator is a light emitting diode.

13. The motor arrangement of claim 7, wherein the voltage source is a battery pack.

14. The motor arrangement of claim 7, wherein the voltage source is a battery pack having a plurality of lithium based individual cells.

15. An arrangement for checking the operation of an actuating circuit of a motor arrangement; the actuating circuit including electronic switching elements, the motor arrangement including a DC motor having electrical voltage connections, an actuating circuit, the electrical voltage connections being configured to connect to a supply voltage $U_v$ of a voltage source via the actuating circuit, the actuating circuit being configured to set an operating voltage $U_B$ for operating the DC motor, the supply voltage $U_v$ being greater than the operating voltage $U_B$, an operating switch arranged between the actuating circuit and the voltage source and configured to start up the actuating circuit and the DC motor, and an indicator; the arrangement comprising:
a testing device configured to detect a potential at said voltage connections of said DC motor within a time window Δt after an initialization of said actuating circuit begins at a first point in time $t_1$ and prior to said DC motor starting up;

a measurement line connecting said testing device to one of the voltage connections;

said testing device being configured to actuate the indicator when, within the time window $\Delta T$ starting at the first point in time $t_1$ of the initialization of the control circuit and prior to said DC motor starting up, the potential applied to said measurement line is above a predetermined limit value.

\* \* \* \* \*